(12) United States Patent
Kohmura et al.

(10) Patent No.: US 6,647,776 B2
(45) Date of Patent: Nov. 18, 2003

(54) SPLIT-FLOW FLOWMETER WITH A PROFUSION FACING THE DETECTION ELEMENT

(75) Inventors: Yoshihiko Kohmura, Aichi (JP); Shunsuke Maeda, Aichi (JP); Takio Kojima, Aichi (JP); Takafumi Oshima, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 10/139,244

(22) Filed: May 7, 2002

(65) Prior Publication Data

US 2002/0166376 A1 Nov. 14, 2002

(30) Foreign Application Priority Data

May 8, 2001 (JP) .......................... 2001-137505

(51) Int. Cl.⁷ .................................. G01F 1/68
(52) U.S. Cl. ............................. 73/204.21; 73/202.5
(58) Field of Search ..................... 73/202, 202.5, 73/204.21, 861.63

(56) References Cited

U.S. PATENT DOCUMENTS 3,636,765 A * 1/1972 Brown .................... 73/861.64
3,736,797 A * 6/1973 Brown .................... 73/861.64
5,383,357 A * 1/1995 Doll ......................... 73/118.2
6,332,356 B1 12/2001 Hecht et al.

FOREIGN PATENT DOCUMENTS

| EP | 1 091 195 A1 | 4/2001 |
| EP | 1 134 560 A2 | 9/2001 |
| EP | 1 179 726 A2 | 2/2002 |
| JP | 2000-304585 | 11/2000 |
| JP | 2001-4420 | 1/2001 |

* cited by examiner

*Primary Examiner*—Harshad Patel
(74) *Attorney, Agent, or Firm*—Sughrue Mion, PLLC

(57) ABSTRACT

A split-flow-type flowmeter includes a detection element 2 disposed to face a flow path thereof and a venturi structure 4 formed within a flow path 1 in the vicinity of the detection element 2 and adapted to throttle a flow directed toward the detection element 2 to thereby reduce disturbance of the flow. The venturi structure 4 is disposed in opposition to the detection element 2 within the flow path 1 and includes a protrusion 5 protruding toward the detection element 2 within the flow path 1 of the split-flow-type flowmeter.

12 Claims, 9 Drawing Sheets

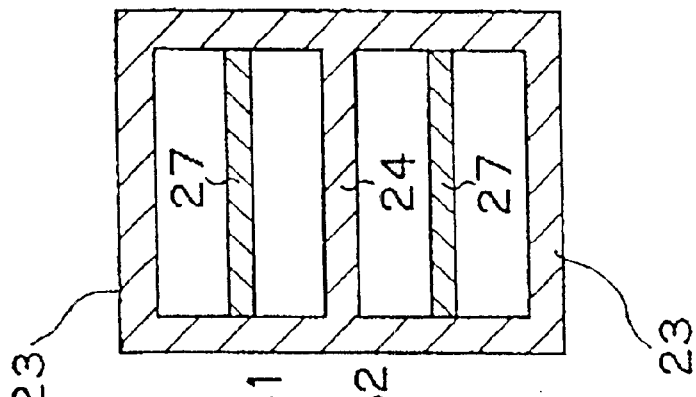
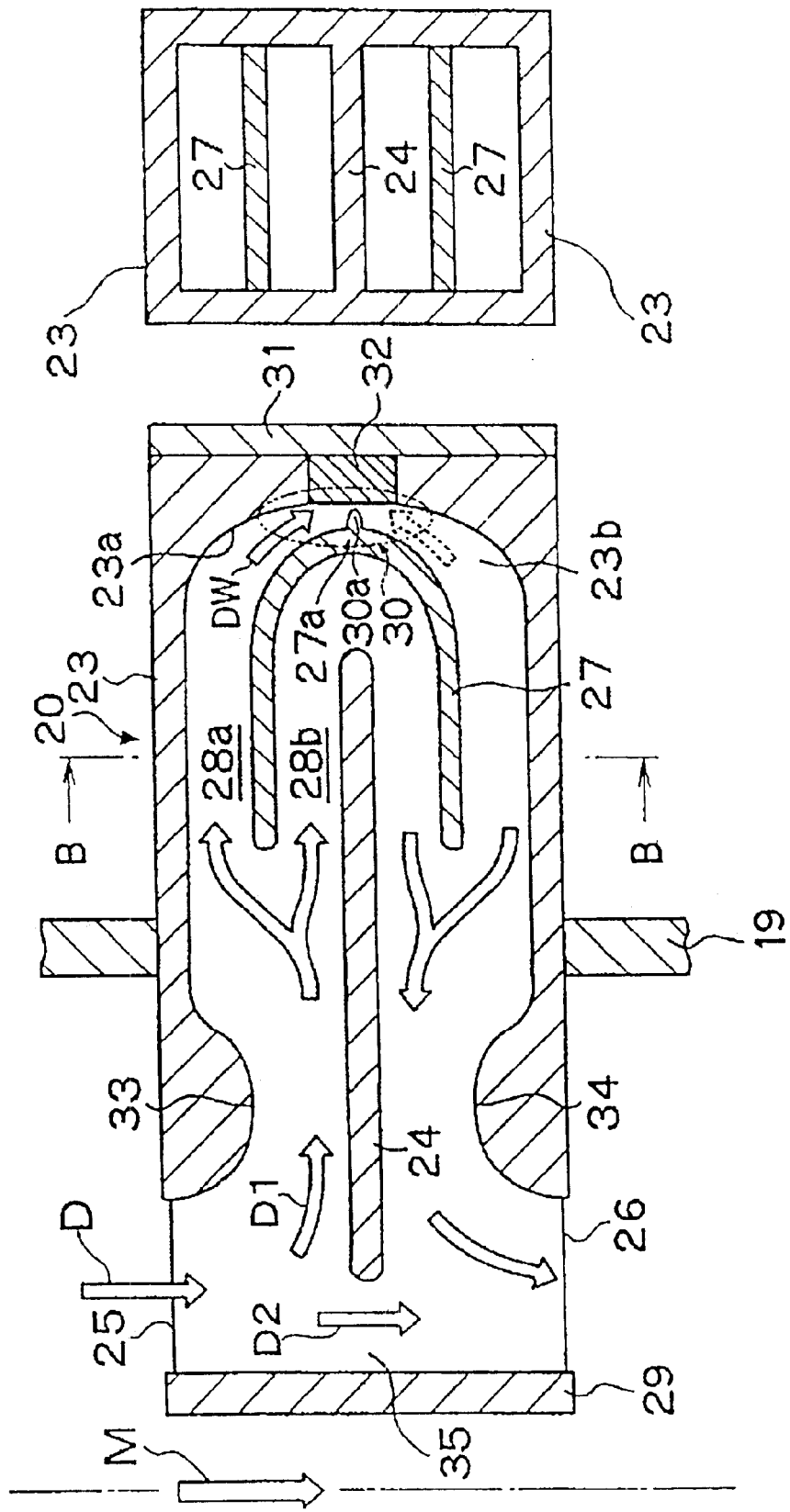

FIG. 2

| SECTION | PROTRUSION WIDTH | NOT LESS THAN ELEMENT WIDTH(>3mm) | NOT GREATER THAN ELEMENT WIDTH(<3mm) | NOT GREATER THAN ELEMENT WIDTH(<3mm) |
|---|---|---|---|---|
| | PROTRUSION LENGTH | LESS THAN 1mm | LESS THAN 1mm | NOT LESS THAN 1mm |
| | | (1) ENTIRE | (2) PARTIAL (WIDE) | (3) PARTIAL (NARROW) | (4) PARTIAL (NARROW & LONG) |
| (A) FLAT TYPE | | | | | |
| (B) R TYPE | | | | | |
| (C) FULL R TYPE | | | | | |
| (D) SPINDLE TYPE | | | | | |
| (E) OGIVAL TYPE | | | | | |
| (F) PYRAMIDAL TYPE | | | | | |

SPLIT-FLOW FLOWMETER WITH A PROFUSION FACING THE DETECTION ELEMENT

BACKGROUND OF THE INVENTION

1. Field of the Invention

The present invention relates to a split-flow flowmeter for measuring parameters related to flow, particularly flow rate and flow velocity. More particularly, the invention relates to a split-flow flowmeter using an exothermic or endothermic detection element and/or a detection element integrally formed on a semiconductor chip; for example, a split-flow flowmeter favorably applicable to a mass flow sensor for use in combustion control of a vehicle engine or an industrial engine, a mass flow sensor for use in an industrial air-conditioning system or a compressed-air supply system, or a flow sensor for use in control of the air-fuel ratio of a household gas cooker.

2. Description of the Related Art

In recent years, the circumstances surrounding automobiles have shifted toward stronger consideration for the environment, as has been demanded by emission regulations and the like. In order to comply with such regulations, engine combustion must be controlled with higher accuracy, and in this connection a flowmeter must be able to accurately measure a flow rate within a suction pipe.

Conventionally, a split-flow flowmeter has been proposed as a flowmeter for measuring a flow rate within a suction pipe. The split-flow flowmeter detects a portion of flow diverted from a main-flow pipe (an object pipe of measurement) into a flow path thereof (hereinafter also referred to as a "split-flow passage" or a "flow splitter tube") to thereby measure a flow rate in the main-flow pipe.

3. Problems to be Solved by the Invention

However, a conventionally proposed split-flow flowmeter involves the following problems: flow disturbance on a detection element is great; in particular, the measurement accuracy is low in measuring a low-flow-rate region.

SUMMARY OF THE INVENTION

It is therefore an object of the present invention to provide a split-flow-type flowmeter capable of reducing flow disturbance in the vicinity of a detection element within a flow path thereof and capable of accurately measuring flow rate in a low-flow-rate region.

The above objects of the present invention have been achieved by providing a flowmeter for detecting a portion of flow diverted from a main-flow pipe, which is an object of measurement, into the same, using a detection element so as to measure parameters related to the flow within the main-flow pipe; i.e., a split-flow flowmeter, which comprises a detection element disposed to face a flow path through which a fluid to be measured flows, and a venturi structure adapted to throttle a flow directed toward the detection element to thereby reduce disturbance of the flow. The split-flow flowmeter is characterized in that the venturi structure is disposed opposite the detection element within the flow path and comprises a protrusion protruding toward the detection element within the flow path.

This split-flow flowmeter is mainly characterized in that a portion of the venturi structure assumes the form of a protrusion. However, the entire venturi structure (the venturi structure itself) may assume the form of a protrusion. In such a split-flow flowmeter, the venturi structure reduces flow disturbance in the vicinity of the detection element within the flow path of the split-flow flowmeter, whereby a flow rate can be accurately measured with small variations in output. Further, the protrusion reduces a region where resistance to flow arises, and can generate a large pressure difference, whereby the rate of flow passing through a clearance between the protrusion and the detection element can be easily increased even in measuring a low-flow-rate region, thereby greatly enhancing output. Further, in this split-flow-type flowmeter, since a region where resistance to flow arises is reduced, output is also enhanced in measuring in a medium-flow-rate region and a high-flow-rate region. Additionally, since throttling yields the effect of reducing disturbance, measurement can be carried out at high resolution, whereby a flow rate can also be accurately measured in medium- and high-flow-rate regions.

A preferred mode for carrying out the present invention will next be described.

According to a preferred mode for carrying out the present invention, a venturi structure partially protrudes (a protrusion is formed on the venturi structure); i.e., a portion of the venturi structure is formed into a protrusion. The protrusion is disposed opposite a detection element within a flow path of a split-flow-type flowmeter and protrudes toward the detection element within the flow path. An example of the detection element may be a diaphragm type in which a heater and two temperature sensors are formed for detecting a gas flow (as described in U.S. patent application Ser. No. 09/754,343, incorporated herein by reference, or European Patent Application No. 01300077.3 filed by the present applicant).

Preferably, the venturi structure is configured such that the outside wall of a bottom portion of a curved partition, which is disposed within a split-flow passage so as to impart substantially the shape of the letter Ω to the passage, is disposed in the opposing proximity of the detection element. A protrusion is formed which protrudes toward the detection element from the outside wall of the curved partition. A height (B) of the protrusion is preferably in the range of 0.5–4.5 mm, a gap or clearance (A) between the protrusion and the detection element is preferably in the range of 0.3–3 mm and a thickness (Dt) of the protrusion is preferably in the range of 0.5–3 mm not exceeding the width or length of the detection element as measured in a gas flow direction, as may be understood by FIG. 9. Preferably, the protrusion has a ridge-like shape as shown in FIG. 11, in which a ridge length (H) is preferably in the rage of 1–10 mm and the length of the detection element is within the ridge length (H). Importantly, the protrusion protrudes sharply. In other words, a convex radius (C) formed at a bottom skirt of the protrusion as shown in FIG. 9 is about less than 2 mm. Each of these dimensional factors contributes to a sensitive detection of the pressure variation of a gas flowing over the detection element.

According to the preferred mode for carrying out the present invention, a portion or the entirety of a surface of the protrusion which faces the detection element is curved. This feature prevents the generation of vortexes or separation of flow in the vicinity of the protrusion, and thus disturbance of air flow is reduced, thereby enhancing output.

According to the preferred mode for carrying out the present invention, a section of the protrusion taken along a plane extending in a flow direction in a flow path (split-flow passage) of a split-flow flowmeter assumes, singly or in combination, any of a triangular shape, a rectangular shape, a polygonal shape, a spindle shape, a semicircular shape, and a semielliptic shape. This feature can greatly reduce a region where resistance to flow arises, thereby enhancing output in measurement not only in a low-flow-rate region but also in a high-flow-rate region.

According to the preferred mode for carrying out the present invention, the venturi structure comprises a plurality of protrusions. Employing a plurality of protrusions in combination can impart the desired flow rate characteristics to the flowmeter.

According to the preferred mode for carrying out the present invention, the flow path structure of the split-flow flowmeter is formed to have symmetry with respect to a plane including the centerline perpendicular to a detection portion of the detection element. Particularly, the plurality of protrusions are arranged symmetrically with respect to the plane. Such a split-flow-type flowmeter can equivalently measure a regular flow and a backflow.

According to the preferred mode for carrying out the present invention, the plurality of protrusions are formed or arranged opposite one another along the flow transversal direction of the flow path of the split-flow flowmeter. A groove or a space is formed between the protrusions and functions to guide a flow toward the detection portion of the detection element.

Preferably, a groove or a space which opens toward the detection portion of the detection element is formed between the plurality of protrusions. This feature allows sufficient flow rate in measuring a low-flow-rate region, and thus output is enhanced in measuring a low-flow-rate region. Since a throttle is formed in a very small region, a flow can only be led to the detection portion of the detection element while a region where resistance to flow arises is reduced. Additionally, since a large pressure difference can be generated, flow rate can be increased in measuring a low-flow-rate region, thereby enhancing output.

Preferably, a high protrusion which protrudes toward the detection element is formed between the plurality of protrusions. In measuring a low-flow-rate region, throttling effected by the central high protrusion enhances output. In measuring a high-flow-rate region, low protrusions located on either side of the central high protrusion provide bypasses in order to delay saturation to thereby increase output during measurement of high flow rate.

According to the preferred mode for carrying out the present invention, the clearance between the tip of the protrusion and the detection element is equal to or smaller than the length of the protrusion as measured along a direction parallel with the surface of the diaphragm of the detection element and perpendicular to a flow direction (a length as measured along the flow transversal direction). For example, when the protrusion length is not greater than 3 mm as measured along the flow transversal direction, the clearance between a tiptop of the protrusion and the detection element is preferably not greater than 3 mm. The above-described relationship between the surface of the diaphragm of the detection portion and an opposite surface length (of the protrusion) effects sufficient throttling at an opening portion of the venturi, thereby yielding the desired effects.

A split-flow-type flowmeter according to the present invention can measure not only flow rate but also parameters related to flow, such as flow velocity, as needed.

In order to realize stable measurement at high accuracy, the preferred mode for carrying out the present invention comprises a bypass flow path straightly connecting the flow inlet and the flow outlet and bypassing the split-flow passage and/or a venturi structure for decreasing the diameter of the split-flow passage in the vicinity of the detection element. The bypass flow path stabilizes supply of fluid to be measured to the detection element and facilitates diversion of fluid to be measured (flow in the main-flow pipe) into the split-flow passage. The venturi structure effectively rectifies turbulence of fluid to be measured which would otherwise arise on a detection portion (also referred to as a detection surface) of the detection element. Thus, even when pulsation or pulsation plus backflow is generated, the bypass flow path and the venturi structure stabilize measurement and enable measurement with high accuracy.

Particularly, in the case where the split-flow passage assumes a symmetrical structure such that the inlet side and the outlet side are symmetrical with respect to the detection element, employing a venturi structure for decreasing the size of the bypass flow path or the diameter of a flow cross section of the bypass flow path further stabilizes flow reaching the detection element even when pulsation or pulsation plus backflow is generated.

According to the preferred mode for carrying out the present invention, a venturi structure is disposed in the bypass flow path to thereby determine the flow rate of fluid to be measured and diverted toward the detection element, by means of the amount of projection of a flow path wall which constitutes the venturi structure or the area of opening of the venturi structure. Thus, the flow rate of flow heading for the detection element can be quantitatively controlled.

According to the preferred mode for carrying out the present invention, flow control means for forming flow hitting obliquely on the detection surface of the detection element is provided in the split-flow passage. The flow control means causes steady flow onto the detection surface of the detection element, so that flow to be detected reliably flows on the detection surface. Additionally, since generation of vortexes and separation of flow in the vicinity of the detection surface is suppressed, detection accuracy and reproducibility are enhanced.

According to the preferred mode for carrying out the present invention, flow control means for forming flow hitting obliquely on the detection surface of the detection element or forming flow flowing obliquely with respect to the detection surface assumes the form of a flow path surface (an elevated portion) elevated above the detection surface, which elevated flow path is located at least upstream of the detection element, or upstream and/or downstream of the detection element. The form of elevation is not particularly limited so long as a flow hitting obliquely on the detection surface is formed. Preferably, the form of elevation is concave or convex, or the elevated surface is a linear, polygonal, or concavely-curved slant surface.

According to the preferred mode for carrying out the present invention, the detection surface of the detection element is exposed to the interior of the split-flow passage (detection tube) at an inflection portion of the split-flow passage. Preferably, an inflection tube (split-flow passage) is attached to the main-flow pipe (a pipe at which measurement is performed) in a perpendicularly intersecting condition, and the detection element is disposed at an inflection portion (a bent portion, or a curved portion of flow path) of the inflection tube. Alternatively, the detection element is disposed at or in the vicinity of a portion of the split-flow passage where flow is inverted or the direction of flow is greatly changed. Preferably, the detection surface of the detection element is exposed to a portion of the interior of the split-flow passage where flow is fast. Preferably, the detection surface of the detection element is exposed to a portion, or its vicinity, of the interior of the split-flow passage where flow is throttled and then changes its direction.

According to the preferred mode for carrying out the present invention, the detection element mounted on the bottom wall of the split-flow passage (a wall of the flow path located farthest away from the flow inlet and the flow outlet) is located outside the main-flow pipe. Thus, the detection element can be readily mounted or replaced. Also, output from the detection element is readily released.

The preferred mode for carrying out the present invention can use the following detection element. Specifically, the detection element is a thermal detection element comprising a substrate and four thin-film resistors formed on the substrate. More specifically, a diaphragm section and a rim section are formed on a semiconductor substrate. The diaphragm section includes (1) an upstream temperature sensor, (2) a downstream temperature sensor, and (3) a heater disposed between the upstream temperature sensor and the downstream temperature sensor. The rim section includes (4) an ambient temperature sensor. The diaphragm section is finished very thinly and is thermally insulated.

Next will be described the principle of detection of flow-related parameters, such as flow velocity and flow rate, by use of the detection element.

(1) Power supplied to the heater is controlled such that a constant difference is maintained between the temperature of the heater and the ambient temperature.

(2) Thus, when flow is not present, the upstream temperature sensor and the downstream temperature sensor indicate substantially the same temperature.

(3) However, when flow is present, heat escapes from the surface of the upstream temperature sensor; thus, the temperature of the upstream temperature sensor is reduced. Because of an increase in thermal input from the heater, a temperature change of the downstream temperature sensor is smaller than that of the upstream temperature sensor. Notably, in some cases, the temperature of the downstream temperature sensor may rise.

(4) Flow rate, flow velocity, or a like parameter is detected on the basis of the temperature difference between the upstream temperature sensor and the downstream temperature sensor. The direction of flow is detected from the sign of the temperature difference (magnitude relation). Notably, the temperature difference can be detected on the basis of a change in electrical resistance caused by temperature.

The preferred mode for carrying out the present invention can use another detection element as follows. Specifically, the detection element is a thermal detection element comprising a substrate and three thin-film resistors formed on the surface of the substrate. More specifically, a diaphragm section and a rim section are formed on a semiconductor substrate. The diaphragm section includes (1) an upstream heater and (2) a downstream heater. The rim section includes (3) an ambient temperature sensor. The diaphragm section is finished very thin and thermally insulated.

Next the principle of detection of flow-related parameters will be described, such as flow velocity and flow rate, by use of the detection element.

(1) Power supplied to the upstream and downstream heaters is controlled such that a constant difference is maintained between the upstream/downstream heater and the ambient temperature.

(2) Thus, when flow is not present, the upstream heater and the downstream heater indicate substantially the same temperature.

(3) However, when flow is present, heat escapes from the surfaces of the upstream and down stream heaters; thus, the temperature of the upstream and downstream heaters drops. Because of an increase in thermal input from the upstream heater, a temperature change of the downstream heater is smaller than that of the upstream heater. Notably, in some cases, the temperature of the downstream heater may rise.

(4) Flow rate, flow velocity, or a like parameter is detected from the difference in current or voltage required to maintain a constant temperature between the upstream heater and the downstream heater as obtained on the basis of a temperature drop of each of the upstream and downstream heaters. The direction of flow is detected from the sign of the current or voltage difference (magnitude relation). Notably, the temperature drop can be detected on the basis of a change in electrical resistance caused by temperature.

According to the preferred mode for carrying out the present invention, the detection element measures flow-related values, such as flow rate and/or flow velocity, on the basis of temperature.

The split-flow-type flowmeter according to the present invention can be installed in an intake system of an engine to be mounted in various kinds of vehicles, two-wheeled and four-wheeled, in order to measure an intake rate or a like parameter. For example, the split-flow-type flowmeter according to the present invention is installed in an intake system of an engine to be mounted in a four-wheeled vehicle, somewhere on a pipe line extending between the interior of an air cleaner and a throttle valve. The split-flow-type flowmeter according to the present invention is installed in an intake system of an engine to be mounted on a two-wheeled vehicle; specifically, on an intake pipe connected to a cylinder, on an air funnel within an air cleaner box, or on a like location, in order to measure an intake gas flow rate, an intake gas flow velocity, or a like parameter.

BRIEF DESCRIPTION OF THE DRAWINGS

FIGS. 1(A) and (B) are views illustrating the basic structure of a split-flow-type flowmeter according to Embodiment 1 of the present invention, FIG. 1(A) being a longitudinal, central sectional view of the split-flow-type flowmeter taken along a plane extending along the axial direction of a main-flow pipe, which is an object of measurement and FIG. 1(B) being a sectional view taken along line B—B in FIG. 1(A).

FIG. 2 is an explanatory view of a split-flow-type flowmeter according to Embodiment 2 of the present invention and a matrix of partial sectional views for explaining variations in a venturi structure or protrusion of the split-flow-type flowmeter according to Embodiment 1 of the present invention or a like flowmeter.

DESCRIPTION OF REFERENCE NUMERALS

Figure 3:
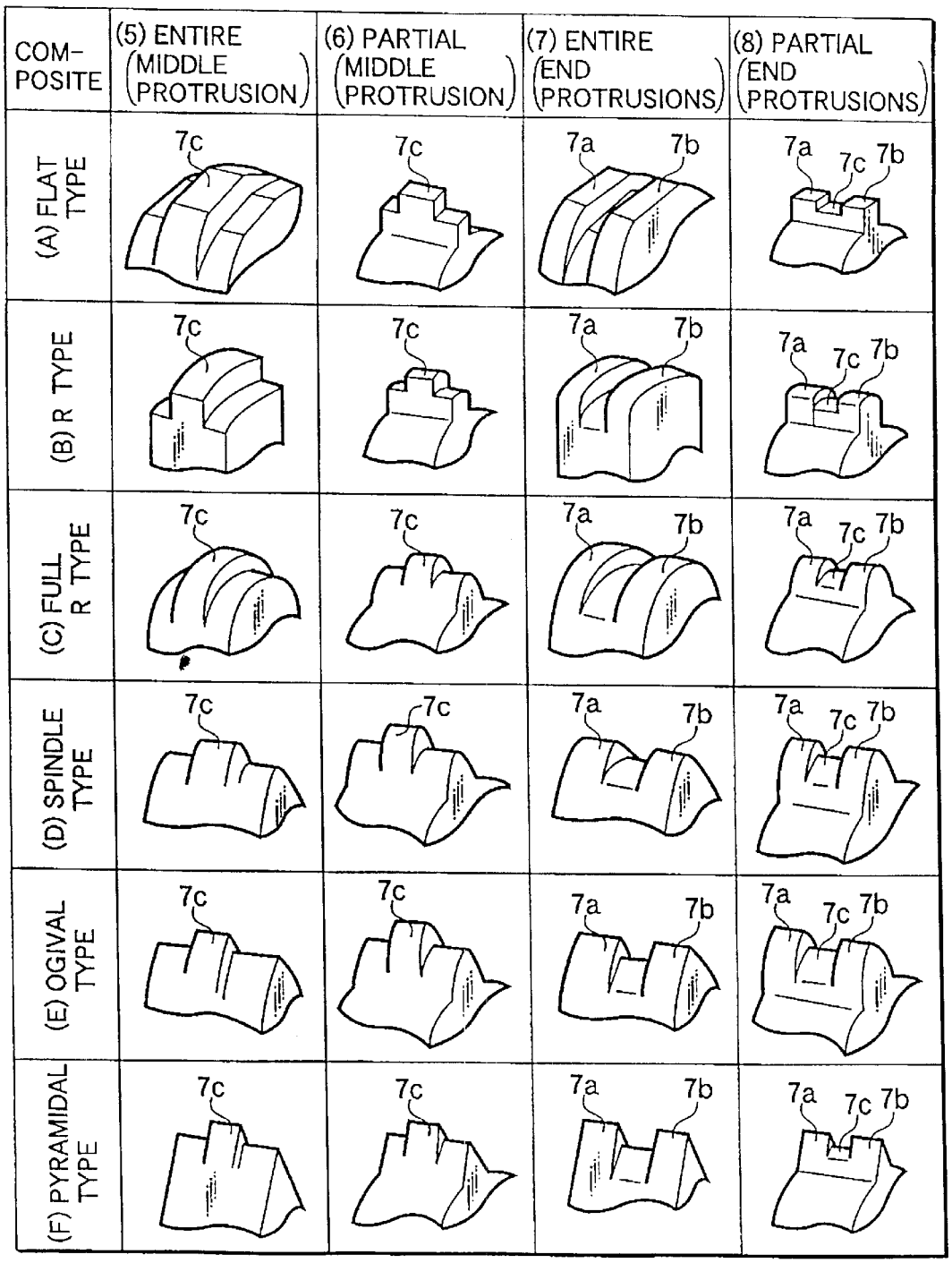
FIG. 3 is an explanatory view of a split-flow-type flowmeter according to Embodiment 3 of the present invention and a matrix of partial perspective views for explaining variations in a protrusion formed on the venturi structure of the split-flow-type flowmeter according to Embodiment 1 of the present invention or a like flowmeter.

1: flow path (split-flow passage) of the split-flow-type flowmeter
2: detection element
3: partition
4: venturi structure
5: protrusion
5a, 5b: a pair of protrusions, end protrusions (a plurality of protrusions)
6: groove
7a, 7b: end protrusion
7c: middle protrusion
8a, 8b: end protrusion
8c: middle protrusion
9: protrusion
10a, 10b: opposite end protrusions
10c: middle protrusion
19: main-flow pipe
20: flow splitter tube
23: outer wall of the flow splitter tube
23a, 23b: elevated portion
24: approach plate (main separator)
25: flow inlet
26: flow outlet
27: partition
27a: detection-element facing portion of the partition
28a, 28b: outer and inner split-flow passages
29: top wall
30: venturi structure
30a: protrusion
31: circuit board
32: detection element
33, 34: undulation
35: bypass flow path
M: main flow (object flow to be measured)
B: height of protrusion
D: split flow (introduced flow)
D1: flow (direction-changed flow) flowing substantially perpendicularly to the direction of the main flow M
D2: flow flowing substantially in parallel with the direction of the main flow A: gap or clearance between protrusion and detection element positioned opposing the protrusion.
DW: downflow
W: clearance between the tip of the protrusion and the detection element

DETAILED DESCRIPTION OF THE PREFERRED EMBODIMENTS

The above-described preferred mode for carrying out the present invention will next be described specifically with reference to the drawings. However, the present invention should not be construed as being limited thereto.

Embodiment 1

First, a split-flow-type flowmeter according to an embodiment of the present invention; specifically, a split-flow-type flowmeter including a venturi structure disposed in opposition to a detection element and configured in such a manner as to partially protrude, will be described.

FIGS. 1(A) and 1(B) are views for explaining the structure of the split-flow-type flowmeter according to the present embodiment. FIG. 1(A) is a longitudinal, central sectional view of the split-flow-type flowmeter taken along a plane extending along the axial direction of a main-flow pipe, which is an object of measurement. FIG. 1(B) is a sectional view taken along line B—B in FIG. 1(A).

Referring to FIGS. 1(A) and 1(B), a main flow M, which is an object flow of measurement, flows through a main-flow pipe 19. A flow splitter tube 20 is attached to the main-flow pipe 19 perpendicularly to the axial direction of the main-flow pipe 19 so as to divert a split flow D from a main flow M into the same. A split-flow passage is formed in the flow splitter tube 20 in such a manner as to be curved substantially in the shape of the letter Ω by an approach plate 24 (main separator) extending substantially perpendicularly to the direction of the main flow M (the axial direction of the main-flow pipe 19). A flow inlet (which may serve as a flow outlet) 25 and a flow outlet (which may serve as a flow inlet) 26 are formed on an outer wall 23 of the flow splitter tube 20 at opposite positions so as to face each other while opening on respective planes extending substantially perpendicularly to the direction of the main flow M. A bypass flow path is formed between a top wall 29 of the flow splitter tube 20 and one end of the approach plate 24 and provides a shortcut between the flow inlet 25 and the flow outlet 26.

A partition 27 is formed within the flow splitter tube 20 in such a manner as to be curved according to a curved profile of the interior of the flow splitter tube 20. The partition 27 forms an outer split-flow passage 28a and an inner split-flow passage 28b within the flow splitter tube 20 such that a flow path branches into the inner and outer split-flow passages 28a and 28b, which, in turn, merge together to become a flow path.

Undulations 33 and 34 are formed on the inner surface of the outer wall 23 at opposite positions (in the vicinity of the flow inlet 25 and the flow outlet 26, respectively) and rise in such a direction as to block the inlet and outlet of the outer split-flow passage 28a. The undulations 33 and 34 provide throttling in the flow path extending between the flow inlet 25 and the inlet of the outer split-flow passage 28a and in the flow path extending between the flow outlet 26 and the outlet of the outer split-flow passage 28a.

A detection element 32 is attached to a bottom wall of the flow splitter tube 20 via a circuit board 31 in such a manner as to be exposed to flow within the outer split-flow passage 28a. In this manner, the detection element 32 is disposed at an inflection portion of the flow splitter tube 20 and is located outside the main-flow pipe 19 for easy replacement.

In the outer split-flow passage 28a, a venturi structure 30 is formed between the detection element 32 and the partition 27. The venturi structure 30 throttles a flow flowing toward the detection element 32 so as to reduce disturbance of the flow.

A portion of the U-shaped bottom of the partition 27 which faces the detection element 32 protrudes toward the detection element 32. Thus, the venturi structure 30 includes a protrusion 30a, which protrudes toward a detection surface of the detection element 32.

Elevated portions 23a and 23b are formed on the inner surface of a bottom portion of the outer wall 23 on either side of the detection element 32 in such a manner as to rise toward the center of a flow cross section of the outer split-flow passage 28a. A flow path surface on the elevated portions 23a and 23b is formed into a concave surface. The partition 27 is convexly curved toward the detection element 32 in the vicinity of the detection element 32. A flow path surface of a detection-element facing portion 27a of the partition 27 is formed into a convex surface, which is convexed toward the detection element 32. Such a flow path structure causes formation of a downflow DW, which obliquely flows toward the detection surface of the detection element 32.

Subsequently, referring to FIGS. 1(A) and 1(B), a flow diverted into the flow path of the split-flow-type flowmeter will be described (in FIG. 1(A), the main flow M flows from left to right):

(1) The split flow D is diverted from the main flow M into the flow splitter tube 20 through the flow inlet 25;

(2) The split flow D is divided, at a position located upstream of the undulation 33, into a flow (direction-changed flow) D1 flowing substantially perpendicularly to the direction of the main flow M and a flow D2 flowing substantially in parallel with the direction of the main flow M. The direction of the flow D1 is changed greatly; specifically, the flow D1 makes a right-angled turn with respect to the split flow D. At this time, since contaminants contained in the split flow D1 are great in mass and inertial force in relation to fluid to be measured, the contaminants fail to follow the sharp change of direction. Thus, the amount of contaminants contained in the flow D1 is reduced. In contrast, since the flow D2 flows substantially straight along the direction of the split flow D, contaminants are carried by the flow D2 through a bypass flow path 35 and are then ejected from the flow splitter tube 20 through the flow outlet 26;

(3a) The flow D1 increases velocity in the course of flowing through a throttling portion defined by the approach plate 24 and the undulation 33 and then flows into the split-flow passages 28a and 28b. Again, contaminants, which are great in mass in relation to fluid to be measured, fail to follow a sharp change of direction made by a flow which has passed the throttling portion. Thus, inertia causes the contaminants to enter the inner split-flow passage 28b. By virtue of an elimination mechanism which eliminates contaminants by utilizing inertia of contaminants at the two changes of direction, fluid to be measured which contains very few contaminants flows into the outer split-flow passage 28a including the detection element 32. Then, the downflow DW, which is a flow hitting obliquely on the detection surface of the detection element 32, is formed. Further, the protrusion 30a can generate a great pressure difference while a region where resistance to flow arises is reduced; thus, the rate of flow flowing through the clearance between the protrusion 30a and the detection element 32 can be easily increased to thereby greatly enhance output, even in measurement in a low-flow-rate region. Also, in measurement in the medium-flow-rate region and the high-flow-rate region, the protrusion 30a enhances output and yields a throttling effect which reduces disturbance to thereby enable measurement at high resolution;

(3b) The flow D2 flows into the bypass flow path 35; and (4) The flow D1 flowing through the split-flow passages 28a and 28b is drawn out by the flow D2 which has passed through the bypass flow path 35, and is thus returned into the main-flow pipe 19 through the flow outlet 26.

The flow splitter tube 20 has a flow path structure which exhibits symmetry with respect to the detection element 32 and with respect to a predetermined plane including the centerline perpendicular to the detection surface of the detection element 32. Thus, the flow splitter tube 20 can be used to measure the flow rate of the main flow M similarly between the case where the main flow M flows from left to right in FIG. 1(A) (regular flow) and the case where the main flow M flows from right to left in FIG. 1(A) (reverse flow).

Next other embodiments of the present invention will be described configured such that, in the flow path of the split-flow-type flowmeter, the venturi structure provided in the vicinity of the detection element includes a protrusion protruding toward the detection element, or the venturi structure itself assumes the form of a protrusion. For the common basic structure of a split-flow-type flowmeter between the above-described embodiment of the present invention and Embodiments 2 to 6 to be described below, the above description can be referred to as appropriate. The description below mainly discusses the differences between the above-described split-flow-type flowmeter and split-flow-type flowmeters according to Embodiments 2 to 6 to be described below.

Embodiment 2

FIG. 2 is a view for explaining variations in the structure of a protrusion formed on the venturi structure in the split-flow-type flowmeter according to Embodiment 1 of the present invention or a like flowmeter. FIG. 2 shows a matrix of partial sectional views of respective split-flow-type flowmeters. The sections are taken along the same direction as in the case of the section of FIG. 1(A). The partition (main separator) is omitted in FIG. 2.

Column (1) shows a type in which a venturi structure does not include a protrusion (the entire venturi structure (the venturi structure itself) assumes the form of a protrusion 4 (5)). Columns (2) to (4) show types in which a venturi structure includes a protrusion: column (2) shows a type in which the length of the protrusion 5 as measured along the flow direction is relatively long, and the width of the protrusion 5 is similar to or wider than that of a detection element 2; column (3) shows a type in which the length of the protrusion 5 as measured along the flow length is short as compared with the type of column (2), and the width of the protrusion 5 is narrower than that of the detection element 2; and column (4) shows a type in which the projecting length (height) of the protrusion 5 is longer than those of the types of columns (2) and (3). Row (A) shows a type in which the tip of the protrusion 5 is formed into a flat portion; row (B) shows a type in which the tip flat portion of the protrusion 5 in column (A) is curved (radiused); row (C) shows a type in which the entire protrusion 5 is curved (radiused); row (D) shows a type in which the protrusion 5 is formed into a spindle shape; row (E) shows a type in which the protrusion 5 is formed into an ogival form; and row (F) shows a type in which the protrusion 5 is formed into a pyramidal shape.

The present invention can use various shapes obtained through combination of the above-described types in rows (2) to (4) and those in columns (A) to (F). Among these protrusion shapes, a particularly preferred shape is of the type in row (4) column (C). This type will be described below by way of example.

In a split-flow-type flowmeter including the venturi structure shown in FIG. 2, a partition 3 is provided within a flow splitter tube. Through employment of the partition 3, a substantially U-shaped flow path (split-flow passage) 1 is formed in the vicinity of the detection element 2. A flow to be measured (split flow D (see FIG. 1(A)) is introduced into the flow path 1. The introduced flow flows toward the detection element 2, which is disposed in such a manner as to face the flow path 1. A venturi structure 4 is formed in the vicinity of the detection element 2; specifically, between the detection element 2 and the partition 3. The venturi structure 4 throttles a flow directed to the detection element 2 to thereby reduce disturbance of the flow.

Further, the protrusion 5 is formed on the venturi structure 4. The protrusion 5 protrudes toward the detection element 2 and is formed on the partition 3 such that the tip thereof faces the detection element 2 within the flow path 1. The tip face of the protrusion 5; i.e., the face (top face) of the protrusion 5 is curved. Preferably, the clearance W (see column (2) row (B)) between the tip of the protrusion 5 and the detection element 2 is not greater than 3 mm.

As exemplified in column (2) row (A), preferably, the protrusion 5 exhibits symmetry with respect to a plane including the centerline of the detection surface of the detection element 2. This symmetry allows a regular flow and a reverse flow to be detected in a similar manner.

Embodiment 3

FIG. 3 is a view for explaining variations in the structure of a protrusion formed on the venturi structure in the split-flow-type flowmeter according to Embodiment 1 of the present invention. FIG. 3 shows a matrix of partial perspective views of partitions of respective split-flow-type flowmeters. In these split-flow-type flowmeters, the venturi structure includes a single or a plurality of small protrusions (small protrusions). In a matrix of perspective views, a flow to be detected basically flows from upper right to lower left (or in the reverse direction).

Column (5) shows a type in which a central portion of a partition as observed on the flow cross section of a flow path entirely protrudes (a middle protrusion 7c is included); column (6) shows a type in which a central portion of a protrusion as observed along the flow direction protrudes (the middle protrusion 7c is included); column (7) shows a type in which opposite end portions of a partition as observed on the flow cross section of a flow path entirely protrude (end protrusions 7a and 7b are included); and column (8) shows a type in which opposite end portions of a protrusion protrude (the middle protrusion 7c and the end protrusions 7a and 7b are included). Types shown in rows (A) to (F) are similar to those of Embodiment 1 described previously, and therefore their redundant description is omitted.

The present invention can use various shapes obtained through combination of the above-described types in rows (5) to (8) and those in columns (A) to (F). Among these protrusion shapes, a particularly preferred shape is of the type in row (8) column (B) and row (8) column (C). These types will be described below by way of example.

In the split-flow-type flowmeters shown in column (8) row (B) and column (8) row (C), a portion of the venturi structure includes the meddle protrusion 7c, which extends substantially in parallel with the detection surface of the detection element, and the end protrusions 7a and 7b, which are located on either side of the meddle protrusion 7c and protrude toward the detection element.

Embodiment 4

Figure 4:
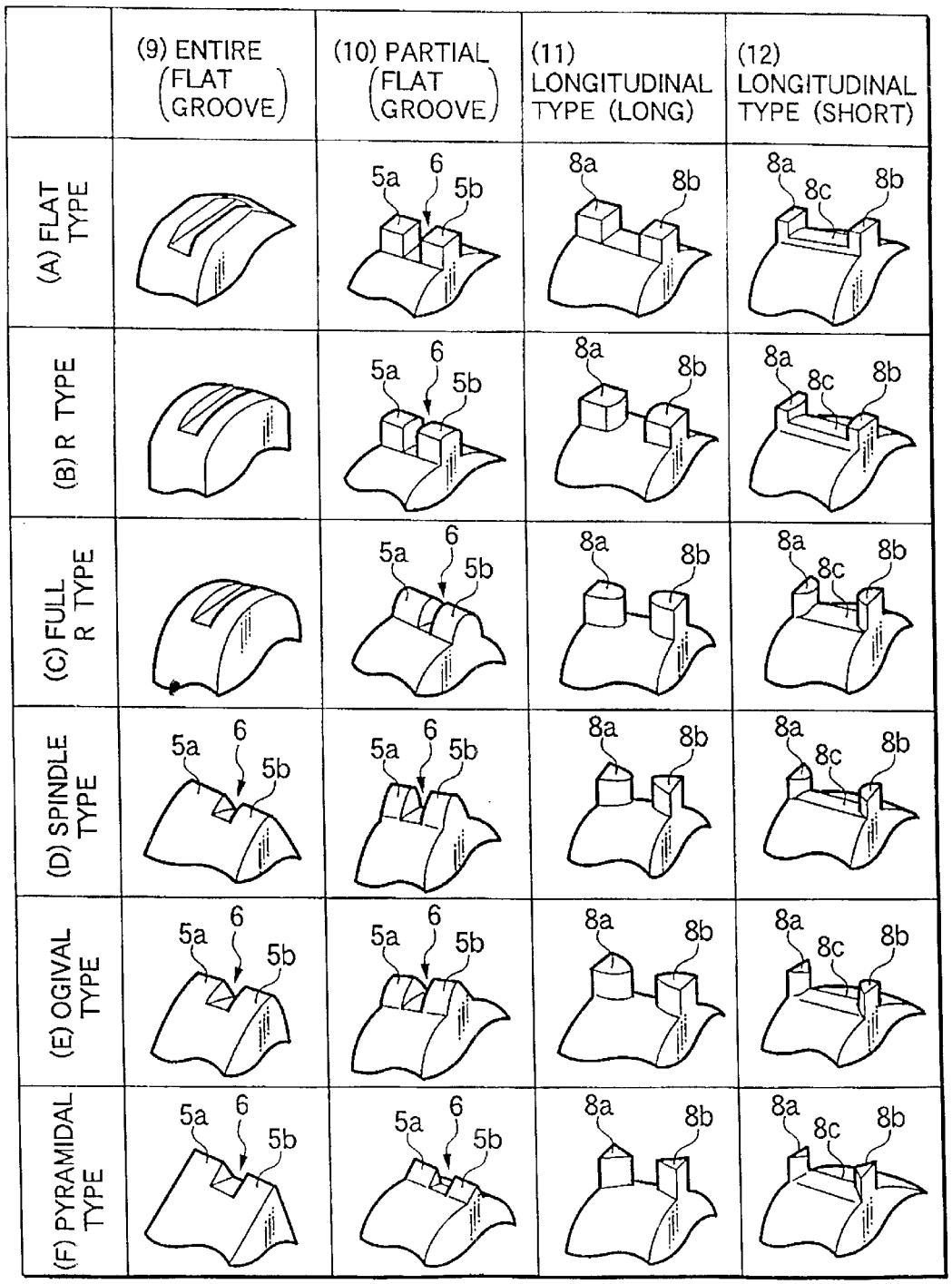
FIG. 4 is an explanatory view of a split-flow-type flowmeter according to Embodiment 4 of the present invention and a matrix of partial perspective views for explaining variations in a protrusion formed on the venturi structure of the split-flow-type flowmeter according to Embodiment 1 of the present invention or a like flowmeter.

FIG. 4 is a view for explaining variations in the structure of a protrusion formed on the venturi structure in the split-flow-type flowmeter according to Embodiment 1 of the present invention. FIG. 4 shows a matrix of partial perspective views of partitions of respective split-flow-type flowmeters. In a matrix of perspective views, a flow to be detected basically flows from upper right to lower left (or in the reverse direction).

Column (9) shows a type in which a flat groove 6 extending along the flow direction is formed on a central portion of a partition wall of the venturi structure; column (10) shows a type in which the flat groove 6 extending along the flow direction is formed between protrusions 5a and 5b formed on a portion of the venturi structure; column (11) shows a type in which a pair of longitudinally long protrusions 8a and 8b are provided in opposition to each other so as to effect the venturi action in two directions; i.e., a large longitudinal throttling mechanism and a small lateral throttling mechanism are formed; and column (12) shows a type in which a pair of longitudinally long protrusions are provided in opposition to each other, and a relatively short protrusion 8c (a groove with a raised bottom) is provided between the long protrusions; i.e., a large longitudinal throttling mechanism, a small lateral throttling mechanism, and a small longitudinal lateral throttling mechanism are formed.

Figure 6:
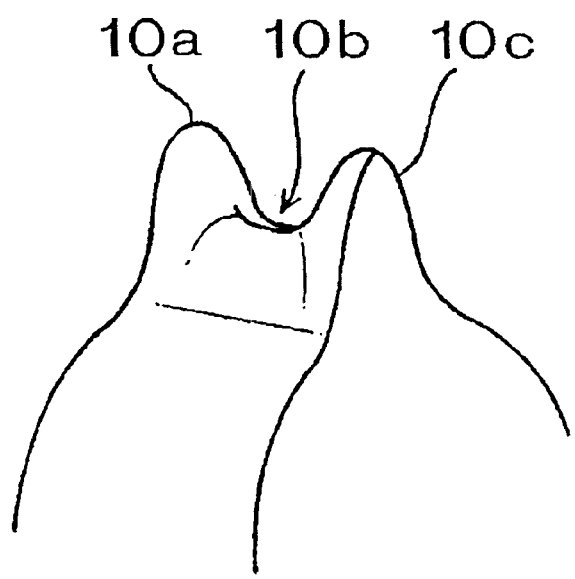
FIG. 6 is an explanatory view of a split-flow-type flowmeter according to Embodiment 6 of the present invention and partial perspective view for explaining a variation of a protrusion formed on the venturi structure of the split-flow-type flowmeter according to Embodiment 1 of the present invention or a like flowmeter.

The present invention can use various shapes obtained through combination of the above-described types in rows (9) to (12) and those in columns (A) to (F) as well as through additional combination with the shapes shown in FIG. 3. For example, the above-described types in columns (8) and (12) may be combined such that a resultant protrusion assumes a smooth outline, whereby a venturi structure as shown in FIG. 6, which will be described later, can be obtained.

Embodiment 5

Figure 5:
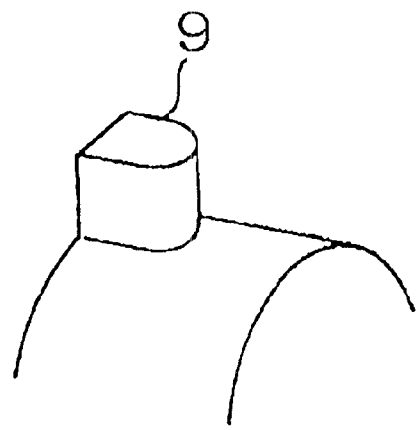
FIG. 5 is an explanatory view of a split-flow-type flowmeter according to Embodiment 5 of the present invention and partial perspective view for explaining a variation of a protrusion formed on the venturi structure of the split-flow-type flowmeter according to Embodiment 1 of the present invention or a like flowmeter.

FIG. 5 is a view for explaining a further variation of the structure of a protrusion formed on the venturi structure in the split-flow-type flowmeter according to Embodiment 1 of the present invention or a like flowmeter. FIG. 5 is a partial perspective view of a partition for explaining a venturi structure including only a single protrusion.

FIG. 5 shows an example in which only a single protrusion 9 assuming a shape similar to that of the type in column (11) row (C) of FIG. 4 is formed. In this case, the protrusion 9 assumes a three-dimensional shape whose cross section is semielliptic as viewed from a detection element. In order that a gas to be measured flows on the detection surface of the detection element, the curved surface of the protrusion 9 faces toward the center of a flow path.

Embodiment 6

FIG. 6 is a view for explaining a further variation of the structure of a protrusion formed on the venturi structure in the split-flow-type flowmeter according to Embodiment 1 of the present invention or a like flowmeter. FIG. 6 is a partial external view for explaining the three-dimensional shape of a protrusion including smooth curved surfaces (a partial view showing a protrusion and its vicinity).

Referring to FIG. 6, a saddle-shaped protrusion is formed on an arcuately or elliptically curved surface and includes three protrusions 10a, 10b, and 10c arranged in a row. The opposite end protrusions 10a and 10b are higher than the central protrusion 10c. Since the shape of the saddle-shaped protrusion is composed of smoothly curved surfaces, disturbance of a fluid to be measured is very low, and resistance to flow is low.

Measurement Example 1

Figure 7:
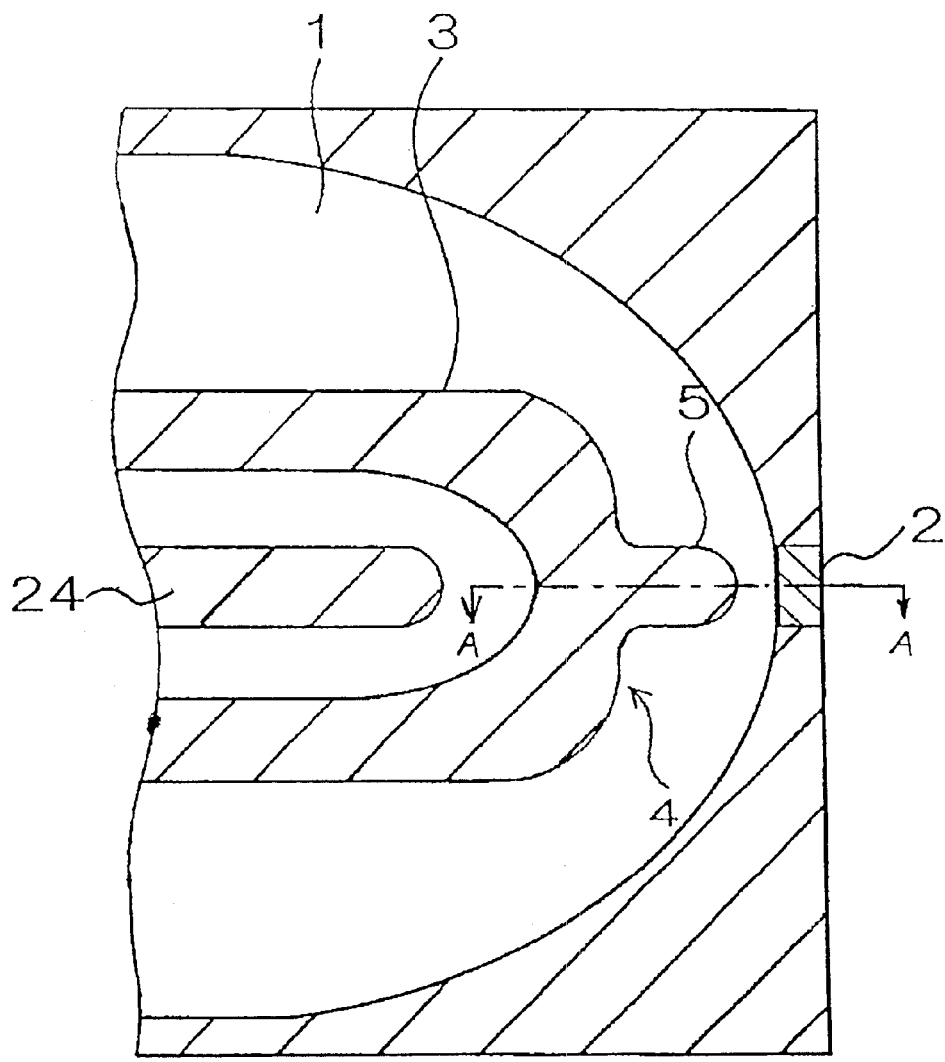
FIG. 7 is a sectional view showing essential portions of a split-flow-type flowmeter used in Measurement Example 1 of the present invention.

Output from the split-flow-type flowmeter according to an Example of the present invention was measured while a flow rate in a main-flow pipe was varied. FIG. 7 is a partial sectional view for explaining the structure and dimensions of the split-flow-type flowmeter which was used in the present Measurement Example.

In the split-flow-type flowmeter shown in FIG. 7, a portion of a venturi structure 4 is formed into a protrusion 5. The tip of the protrusion is formed into a semicircular shape (R 0.5 mm). The width of the protrusion 5 is about 1 mm, which is narrower than the width of a detection element (the width of a diaphragm serving as a detection portion of the detection element 2 as measured along the direction parallel with the surface of the diaphragm and perpendicular to the flow direction (a width as measured along the flow transversal direction), or 3 mm. The protrusion 5 has a protruding length of about 2 mm. The clearance between the tip of the protrusion 5 and the detection element 2 (the gap between the tip of the protrusion 5 and the detection element 2) is about 0.5 mm. The linear flow path of the split-flow-type flowmeter has an width of opening of about 3 mm. An inflection portion of the flow path of the split-flow-type flowmeter has a radius of curvature of 3 mm, or R 3 mm, as measured on the inner surface thereof, and a radius of curvature of 4 mm, or R 4 mm, as measured on the outer surface thereof. A rising portion of the protrusion 5 has a radius of curvature of 0.5 mm, or R 0.5 mm.

This split-flow-type flowmeter was attached to the main-flow pipe 19 as shown in FIG. 1(A), and measurement was carried out. For comparison, measurement was carried out similarly by use of a split-flow-type flowmeter according to a Comparative Example which has a structure and dimensions similar to those of the split-flow-type flowmeter according to the Example of the present invention except that the protrusion 5 shown in FIG. 7 is not provided.

Figure 8A:
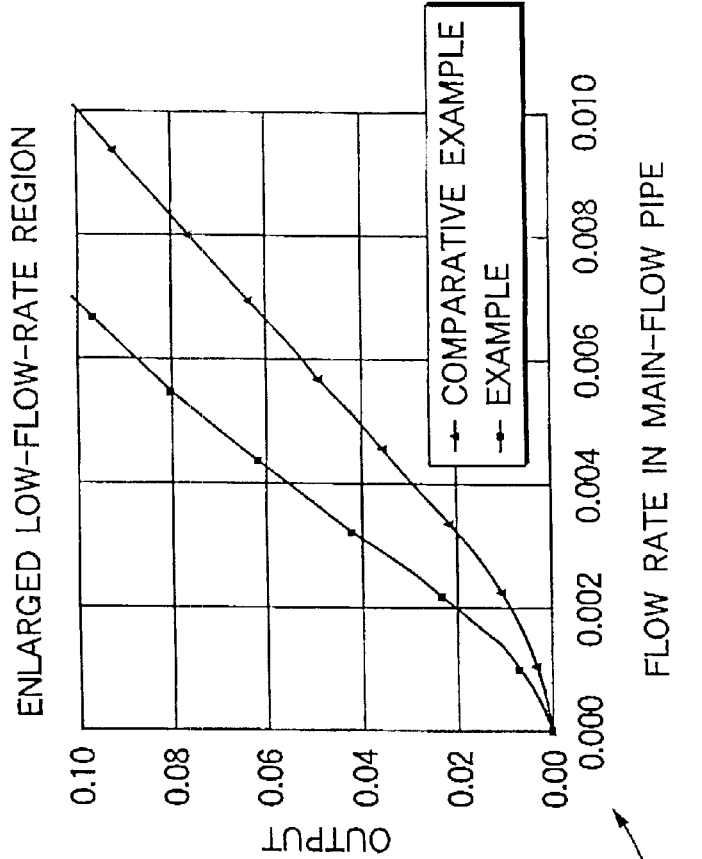
FIG. 8(A) is a graph showing the results of Measurement Example 1.
Figure 8B:
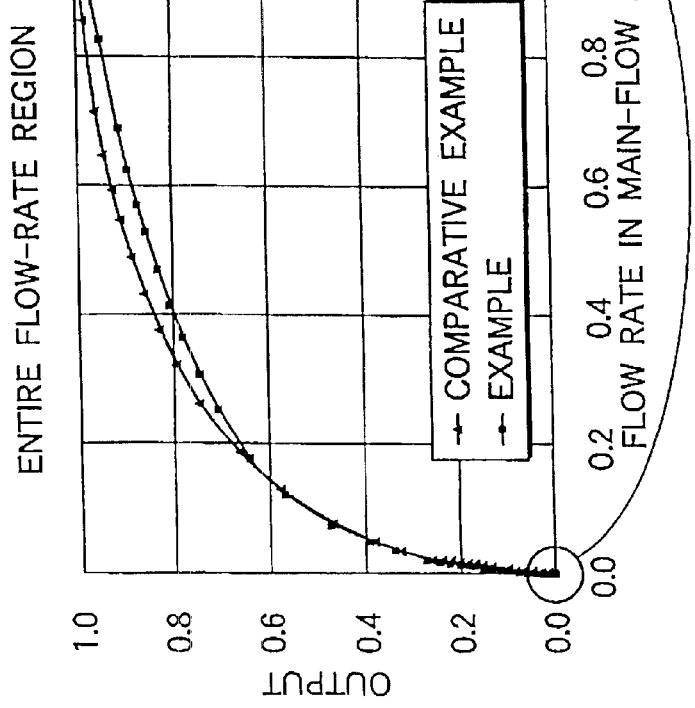
FIG. 8(B) is an enlarged view of the low-flow-rate region of FIG. 8(A).

FIGS. 8(A) and 8(B) are graphs for explaining the results of Measurement Example 1. FIG. 8(A) is a graph showing the relationship between the flow rate in the main-flow pipe and the output of the split-flow-type flowmeters. FIG. 8(B) is an enlarged graph showing a portion of the graph of FIG. 8(A) which corresponds to the low-flow-rate region. Notably, all data appearing in FIGS. 8(A) and 8(B) are represented by relative values in relation to the maximum flow rate and the maximum output which are normalized to a value of 1.0.

Referring to FIG. 8(B), in the low-flow-rate region, particularly at a flow rate not greater than 0.01 (output of split-flow-type flow meter)/1 (flow rate in main-flow pipe), the split-flow-type flowmeter according to the Example of the present invention exhibited an output level which is about 1.5–2 times that of the split-flow-type flowmeter according to the Comparative Example.

Figure 9:
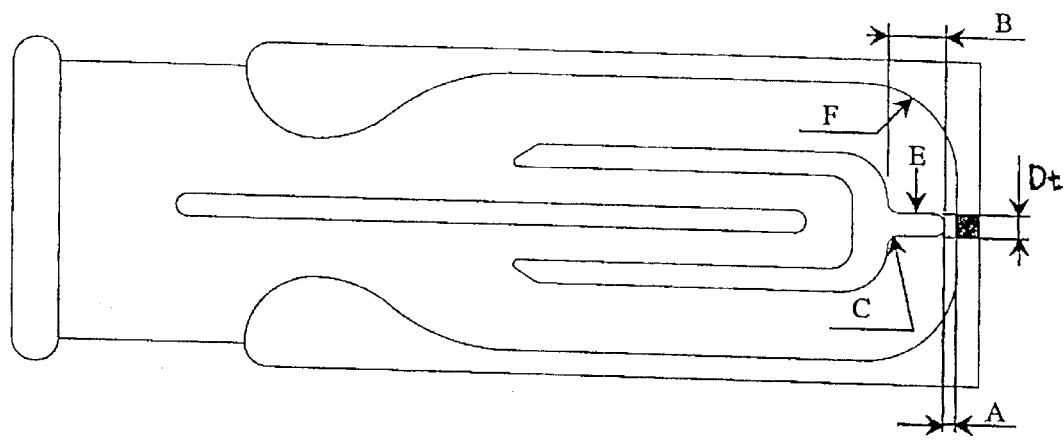
FIG. 9 is a sectional view of a split-flow type flowmeter, showing a dimensional relation according to the invention.

Referring now to FIG. 9, when the gap or clearance (A) between the top or ridge of the protrusion is made smaller, finer performance is attained, but if the gap is made less than 0.3 mm, uniform adjustment of flowmeters in production becomes critical or rather very difficult. If the gap (A) exceeds 5 mm, the advantage of the protrusion is lost. When the height (B) of the protrusion exceeds 4.5 mm, a gas pressure loss or gas resistance becomes too high, thereby severely impairing the flow detection performance. When the height (B) is less than 0.5 mm, the effect of the protrusion is lost, i.e., abrupt gas pressure reduction around the detection element is not attained. When a radius (C) is less than 2 mm, the performance of flow detection is stable and not varied badly, however if it is more than 2 mm the protrusion effect is lost. The thickness (Dt) of the protrusion should not exceed 3 mm, or rather not exceed the width or length of the detection element as measured in the flow direction. This is because sensitivity to variation of the flow pressure detected by the split flow meter is markedly reduced. However, the thickness (Dt) should not be less than 0.5 mm because performance matching in production becomes critical or difficult. Reference (E) in FIG. 9 refers to a view of the protrusion 5, as shown either in FIG. 11 or FIG. 12. Reference (F) in FIG. 9 represents the radius of the curve formed in the elevated portion 23a or 23b of FIG. 1(A), and the radius is preferably about 2–8 mm, more preferably about 3–4 mm.

Figure 10:
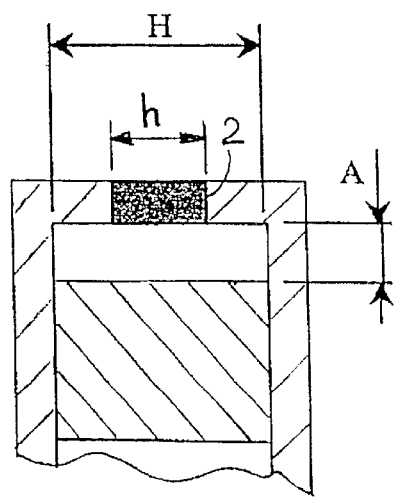
FIG. 10 is a sectional view, cut along line A–A' of FIG.7.
Figure 11:
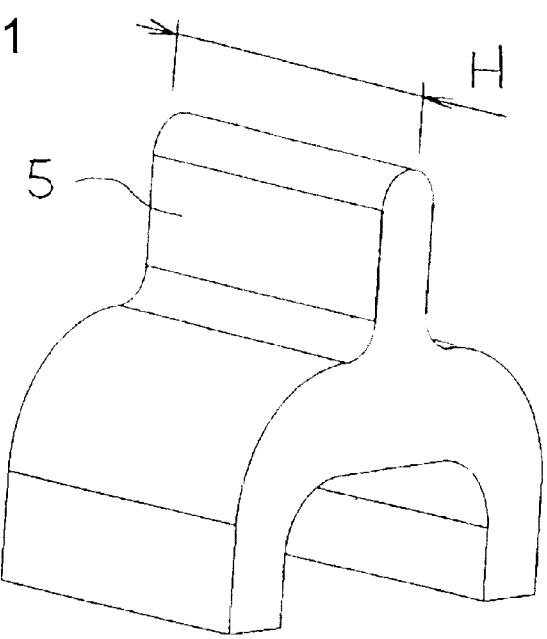
FIG. 11 shows a perspective view of a protrusion formed in a split type flowmeter of FIG. 9, according to one aspect of the Embodiment.

As shown in FIG. 11, the protrusion has a straight and rounded ridge formed on a top of the protrusion. When this protrusion shape is adopted, the clearance (A) should be less than the ridge length (H) of the rounded ridge of the protrusion as shown in FIG. 10, so that stable and accurate flow measurement is attained. The ridge length H is preferably 1–10 mm, more preferably 3–6 mm, as measured perpendicular to the flow direction.

Figure 12:
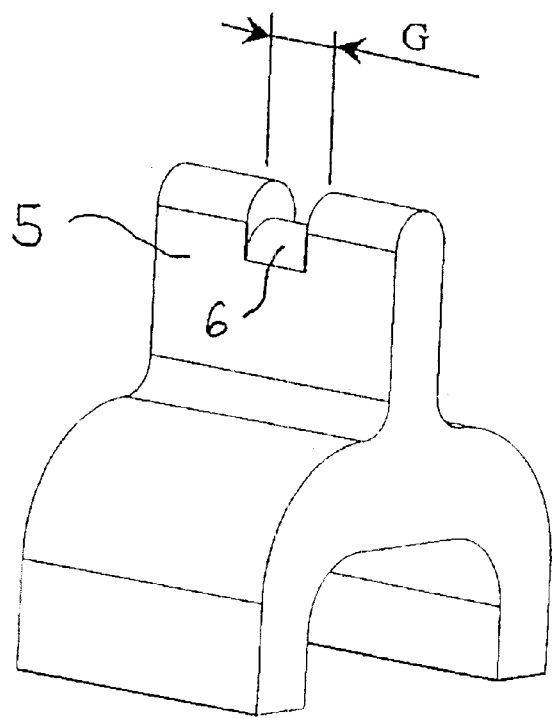
FIG. 12 shows a perspective view of a protrusion usable in a split type flowmeter, according to another aspect of the Embodiment.

As shown in FIG. 12, a recessed ridged portion (or rather a groove 6) may be formed in the middle of the ridge of the protrusion of FIG. 11. The ridge length (G) of the recessed ridged portion 6 (of FIG. 12) as measured perpendicular to the flow direction is preferably from 0.5 mm up to the length or width (h) of the detection element 2 (of FIG. 10), more preferably about 1 mm. The split-flow flowmeter using this ridge-recessed protrusion (as shown in FIG. 12 or FIG. 4) performs better than the split-flow flowmeter using the protrusion (shown in FIG. 10), although adjustment of the ridge-recessed portion so as to be matched with the detection element becomes more difficult.

From the viewpoint of production and performance of the split flow type flowmeter, the protrusion shape shown in FIG. 11 would be best.

In the medium-flow-rate region to the high-flow-rate region, particularly at a flow rate not less than 0.2 (output of split-flow-type flow meter)/1 (flow rate in main-flow pipe), the split-flow-type flowmeter according to the Example of the present invention exhibits delay in saturation of the detection curve as compared with the split-flow-type flowmeter according to the Comparative Example and thus demonstrates high resolution.

EFFECT OF THE INVENTION

The present invention provides a split-flow-type flowmeter capable of reducing a flow disturbance in the vicinity of a detection element within a flow path thereof and capable of accurately measuring a flow rate even in measurement in the low-flow-rate region.

It should further be apparent to those skilled in the art that various changes in form and detail of the invention as shown and described above may be made. It is intended that such changes be included within the spirit and scope of the claims appended hereto.

This application is based on Japanese Patent Application No. 2001-137505 filed May 8, 2001, incorporated herein by reference in its entirety.

What is claimed is:

1. A split-flow flowmeter comprising a detection element disposed to face a flow path through which a fluid to be measured flows, and a venturi structure, said venturi structure throttling a flow directed toward the detection element, wherein the venturi structure is disposed opposite the detection element within the flow path and comprises a protrusion protruding toward the detection element within the flow path.

2. The split-flow flowmeter as claimed in claim 1, wherein a portion or the entirety of a surface of the protrusion which faces the detection element is curved.

3. The split-flow flowmeter as claimed in claim 1, wherein a section of the protrusion taken along a plane extending in a flow direction in the flow path assumes, singly or in combination, any of a triangular shape, a rectangular shape, a polygonal shape, a spindle shape, a semicircular shape, and a semielliptic shape.

4. The split-flow flowmeter as claimed in claim 1, wherein the venturi structure comprises a plurality of protrusions.

5. The split-flow flowmeter as claimed in claim 4, wherein the plurality of protrusions are arranged symmetrically with respect to a predetermined plane including a centerline perpendicular to a detection portion of the detection element.

6. The split-flow flowmeter as claimed in claim 4, wherein the plurality of protrusions are arranged opposite one another along a transverse flow direction of the flow path.

7. The split-flow flowmeter as claimed in claim 4, comprising a groove or a space which opens toward the detection element formed between the plurality of protrusions.

8. The split-flow flowmeter as claimed in claim 4, comprising another protrusion which protrudes toward the detection element formed between the plurality of protrusions.

9. The split-flow flowmeter as claimed in claim 1, wherein a clearance between the tip of the protrusion and the detection element is equal to or smaller than the length of the protrusion as measured along a direction parallel with the surface of the detection element and perpendicular to the flow direction.

10. The split-flow flowmeter as claimed in claim 9, wherein the clearance is in the range of 0.3–3 mm.

11. The split-flow flowmeter as claimed in claim 1, wherein the protrusion has a height in the range of 0.5–4.5 mm.

12. The split-flow flowmeter as claimed in claim 1, wherein the protrusion has a width, as measured in the flow direction, in the range of 0.5–3 mm.

* * * * *